United States Patent
Lu et al.

(10) Patent No.: US 6,825,772 B2
(45) Date of Patent: Nov. 30, 2004

(54) ELECTROLUMINESCENT DASHBOARD CONTROL CIRCUIT

(76) Inventors: Wen-Chien Lu, No. 4, Alley 7, Lane 92, Chian Suey Street, Shu Lin City, Taipei Hsien (TW); Li-Hong Chien, 3F, No. 37, Yung Lo Street, Cheng Kung Li, Lw Chou City, Taipei Hsien (TW)

( * ) Notice: Subject to any disclaimer, the term of this patent is extended or adjusted under 35 U.S.C. 154(b) by 73 days.

(21) Appl. No.: 10/407,444

(22) Filed: Apr. 7, 2003

(65) Prior Publication Data

US 2004/0196157 A1 Oct. 7, 2004

(51) Int. Cl.[7] .................................... G08B 5/00
(52) U.S. Cl. ......................... 340/815.46; 340/815.47; 340/815.52
(58) Field of Search ................ 340/815.46, 815.47, 340/815.79, 815.8, 815.81, 815.69, 321, 901, 902; 446/7, 397; 379/31, 247

(56) References Cited

U.S. PATENT DOCUMENTS

| | | | | |
|---|---|---|---|---|
| 3,568,144 A | * | 3/1971 | Streb | 340/901 |
| 4,216,464 A | * | 8/1980 | Terry | 340/321 |
| 4,265,047 A | * | 5/1981 | Meyer et al. | 446/7 |
| 4,777,645 A | * | 10/1988 | Faith et al. | 379/31 |
| 5,495,242 A | * | 2/1996 | Kick et al. | 340/902 |

FOREIGN PATENT DOCUMENTS

JP          406104962 A    *    4/1994

* cited by examiner

*Primary Examiner*—Van T. Trieu
(74) *Attorney, Agent, or Firm*—Rosenberg, Klein & Lee

(57) ABSTRACT

An electroluminescent dashboard control circuit for automobile in which a voltage comparator is used to control the operation of different colors of electroluminescent lamps subject to the voltage level of inputted voice signal received from a microphone, and a switch is used to select full-light or auto operation mode.

1 Claim, 2 Drawing Sheets

ELECTROLUMINESCENT DASHBOARD CONTROL CIRCUIT

BACKGROUND OF THE INVENTION

1. Field of the Invention

The present invention relates to an automobile dashboard and, more specifically, to an electroluminescent dashboard control circuit for automobile.

2. Description of the Related Art

A variety of automobile dashboards are known. One automobile dashboard design is known comprising a printed face panel with mechanical indicators. Another automobile dashboard design is known having an electroluminescent face panel with mechanical indicators. There are also known automobile dashboards that have an electroluminescent face panel and electronic indicators. These automobile dashboards are monotonous and not attractive to young people.

SUMMARY OF THE INVENTION

The present invention has been accomplished under the circumstances in view. It is one object of the present invention to provide an electroluminescent dashboard control circuit for automobile, which drives different colors of electroluminescent lamps of the automobile dashboard to alternatively emit light subject to the voltage level of inputted voice signal from a microphone. According to one aspect of the present invention, electroluminescent dashboard control circuit comprises a voltage comparator, which controls the operation of different colors of electroluminescent lamps subject to the voltage level of inputted voice signal received from a microphone. According to another aspect of the present invention, the electroluminescent dashboard control circuit further comprises a selector switch for the selection of a full-light mode and an auto mode. When switched to auto mode, the voltage comparator controls the operation of the electroluminescent lamps automatically subject to the voltage level of inputted voice signal. When switched to full-light mode, the electroluminescent lamps are all turned on upon the presence of an input voice signal.

DETAILED DESCRIPTION OF THE PREFERRED EMBODIMENT

Figure 1:
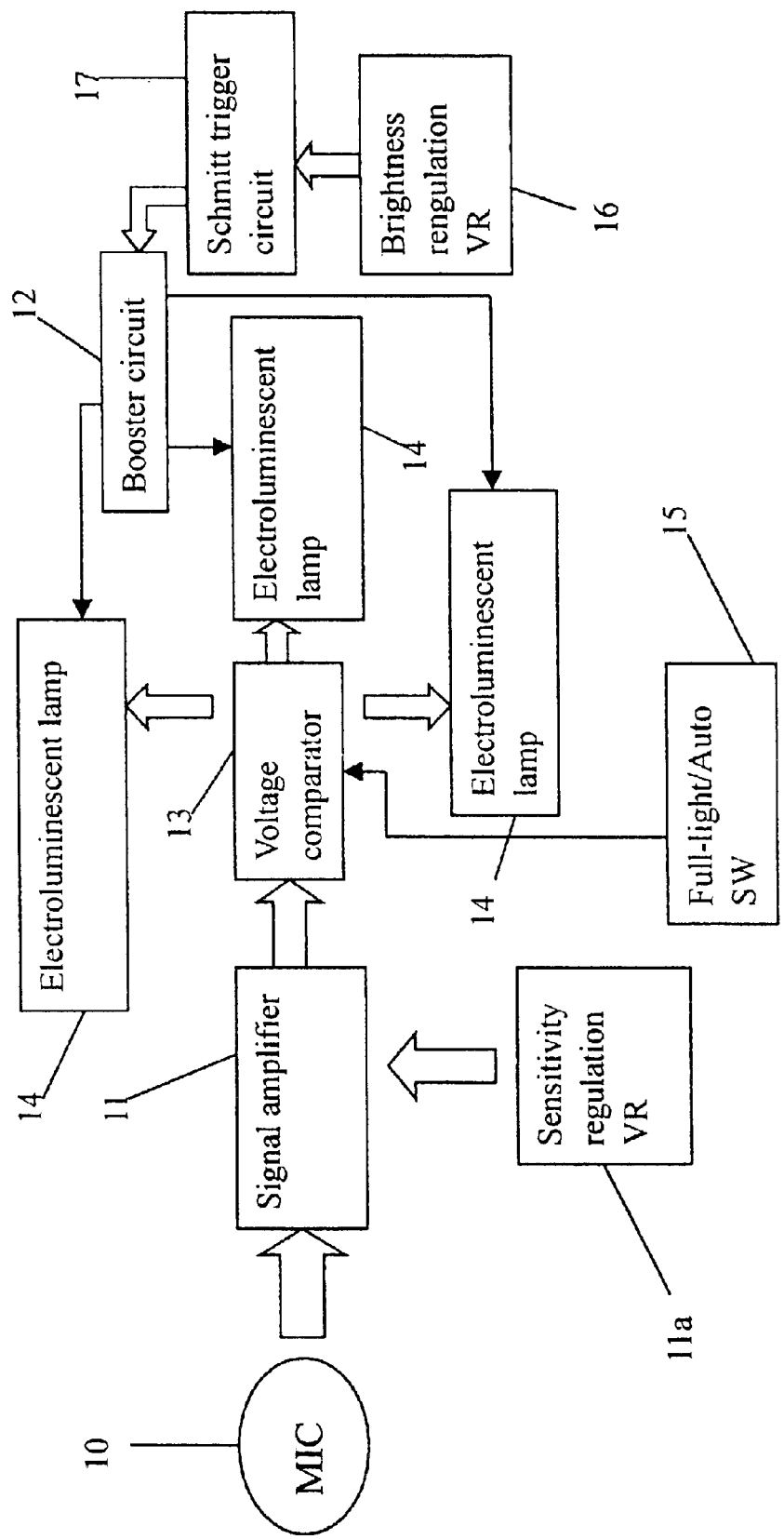
FIG. 1 is a circuit block diagram of the electroluminescent dashboard control circuit according to the present invention.
Figure 2:
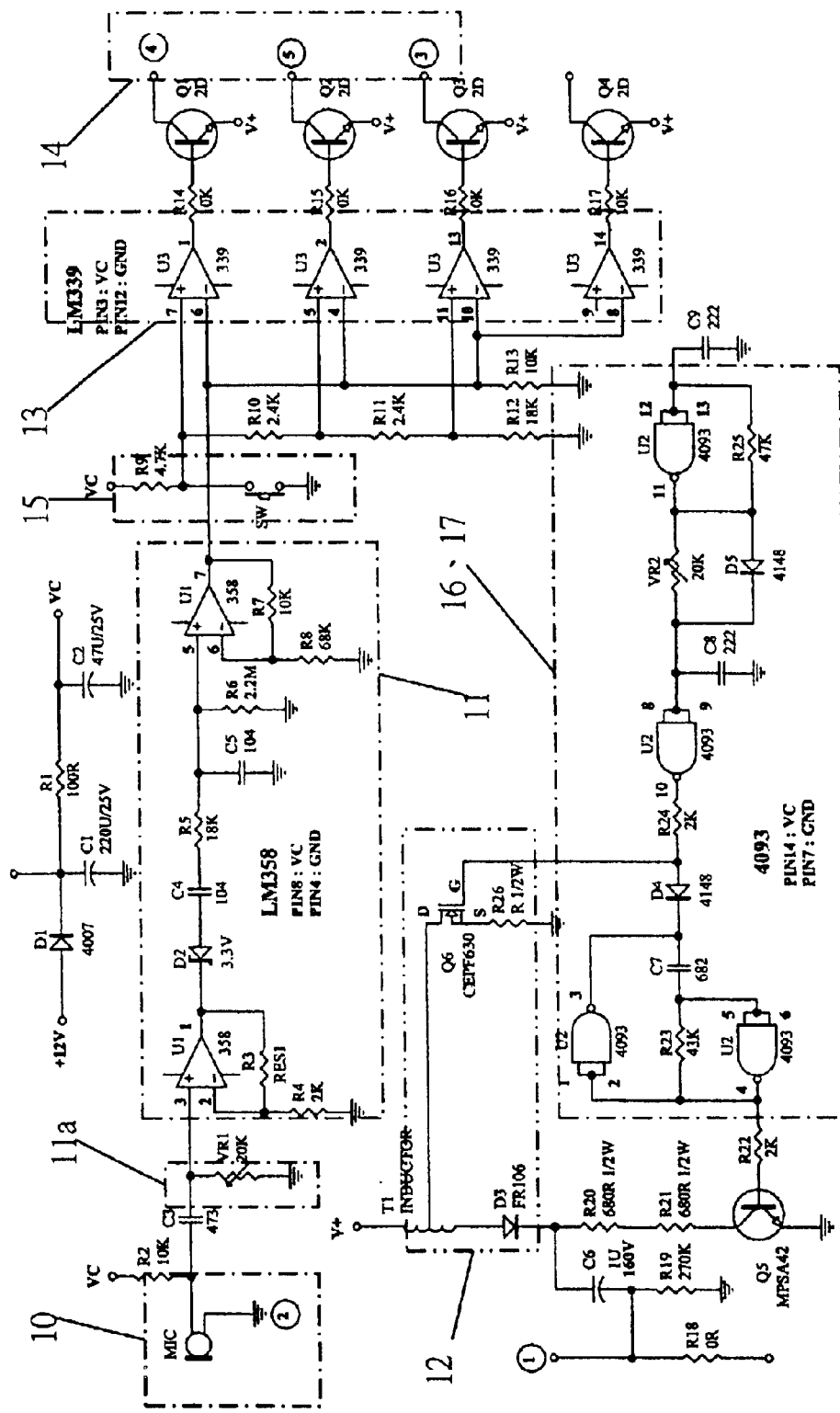
FIG. 2 is a detailed circuit diagram of the electroluminescent dashboard control circuit according to the present invention.

Referring to FIGS. 1 and 2, an electroluminescent dashboard control circuit for automobile in accordance with the present invention is shown comprising a microphone 10 adapted to receive sound (for example, output music from the speaker of the stereo system of the automobile in which the electroluminescent dashboard control circuit is installed), a signal amplifier 11 electrically connected to the microphone 10 and adapted to amplify input voice signal from the microphone 10, a variable resistor 11a electrically connected to the circuit between the microphone 10 and the signal amplifier 11 and adapted regulate the signal receiving sensitivity of the microphone 10, a voltage comparator 13 electrically connected to the output end of the signal amplifier 11 and adapted to detect the voltage level of inputted voice signal, a plurality of electroluminescent lamps 14 respectively electrically connected to the voltage comparator 13 and controlled by the voltage comparator 13 to emit light subject to the voltage level of inputted voice signal, a switch 15 electrically connected to the voltage comparator 13 for full-light/auto selection control, a booster circuit 12 electrically connected to the electroluminescent lamps 14, a Schmitt trigger circuit 17, and a variable resistor 16 electrically connected to the booster circuit 12 through the Schmitt trigger circuit 17 and adapted to regulate the voltage frequency output of the booster circuit 12 and to further regulate the brightness of the electroluminescent lamps 14. When the microphone 10 receiving music tones from the stereo system of the automobile after the switch 15 has been switched to the auto mode position, the voltage comparator 13 drives the electroluminescent lamps 14 to emit light subject to the voltage level of inputted voice signal.

The electroluminescent lamps 14 can be made having different shapes and different colors, and arranged to show a particular design. Therefore, different colors of light are produced at different times following the going of the music tones outputted from the stereo system of the automobile, producing a lighting effect. When the user switched the switch 15 to the full-light mode position, all the electroluminescent lamps 14 are turned on when the microphone 10 receiving music tones.

A prototype of electroluminescent dashboard control circuit has been constructed with the features of FIGS. 1 and 2. The electroluminescent dashboard control circuit functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An electroluminescent dashboard control circuit comprising a microphone adapted to receive external voice signal, a signal amplifier electrically connected to said microphone and adapted to amplify input voice signal from said microphone, a first variable resistor electrically connected between said microphone and said signal amplifier and adapted regulate the signal receiving sensitivity of said microphone, a voltage comparator electrically connected to said signal amplifier and adapted to detect the voltage level of inputted voice signal, a plurality of electroluminescent lamps respectively electrically connected to said voltage comparator and controlled by said voltage comparator to emit light subject to the voltage level of inputted voice signal, a switch electrically connected to the voltage comparator for full-light/auto selection control for enabling said voltage comparator to control the operation of said electroluminescent lamps subject to the voltage level of inputted voice signal when said switch switched to an auto mode position and for enabling said electroluminescent lamps to be turned on at the same time when said switch switched to a full-light mode position upon the presence of a voice input signal at said microphone, a booster circuit electrically connected to said electroluminescent lamps, a Schmitt trigger circuit, and a second variable resistor electrically connected to said booster circuit through said Schmitt trigger circuit and adapted to regulate the voltage frequency output of said booster circuit and to further regulate the brightness of said electroluminescent lamps.

* * * * *